April 8, 1958  A. THOMAS  2,829,414
LINK
Filed May 18, 1953  2 Sheets-Sheet 1

INVENTOR
Albert Thomas
by Hooper Leonard & Bell
his attys.

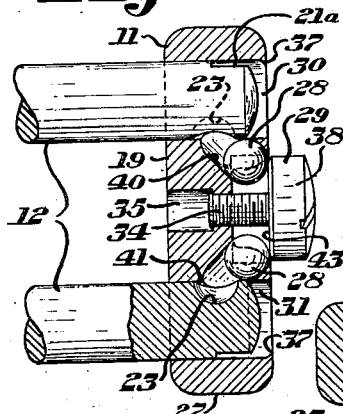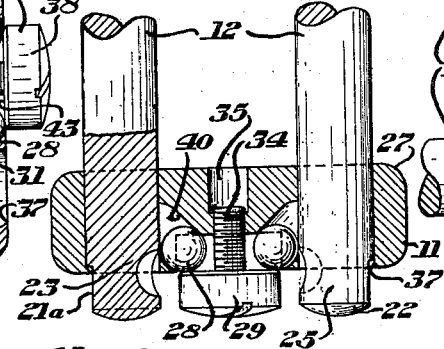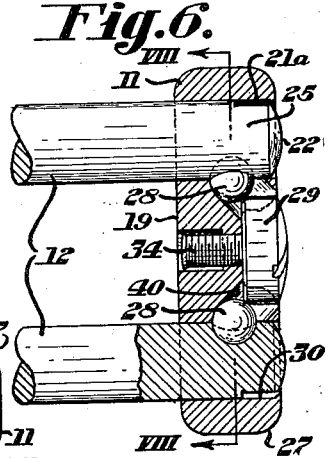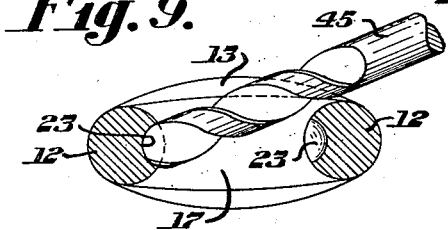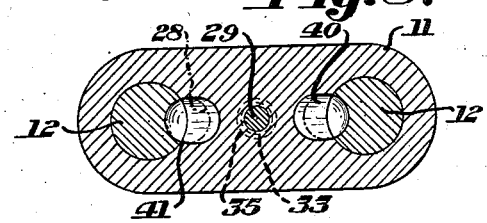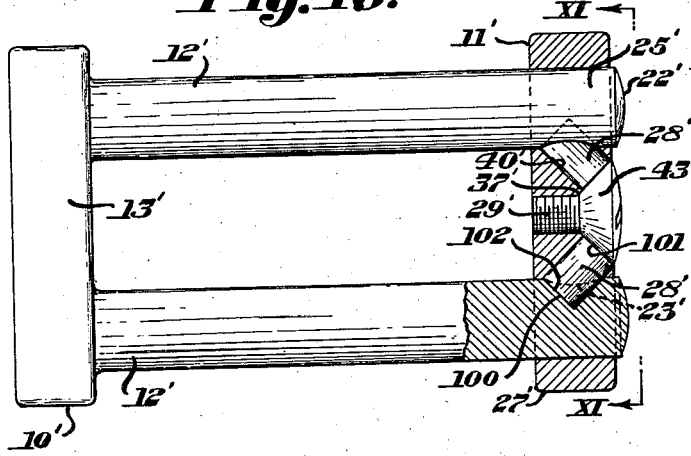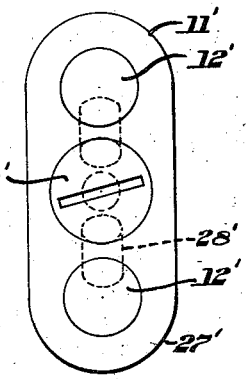

United States Patent Office 2,829,414
Patented Apr. 8, 1958

2,829,414

LINK

Albert Thomas, Munhall, Pa.

Application May 18, 1953, Serial No. 355,684

3 Claims. (Cl. 24—201)

This invention relates to a safe new link having separable parts which may readily be assembled and disassembled. More particularly, the invention pertains to a new kind of link for detachably connecting together parts like, for example, the load harness supporting straps and shroud lines respectively of a parachute. A new method is also provided herein.

A conventional parachute for a person or for cargo includes a harness within which the load in the form of the person or cargo is enclosed. Load supporting straps sometimes called riser straps, lift webs, or suspension straps, are connected to the harness and in use extend upwardly toward the canopy of the parachute. The canopy in turn is provided with shroud lines which in use extend toward the harness. The upper ends of the load supporting straps and the lower ends of the shroud lines are generally provided with loops respectively. In operation, the loops of several adjoining shroud lines are connected to the loop of a load supporting strap immediately thereunder by a metal link such as a solid D-ring or by a metal link having separable parts, one such separable link being illustrated in my prior United States Patent No. 2,447,921.

My new link of this invention is a new kind of device having numerous advantages. Thus, on those occasions when a parachute is not being used and the canopy is to be separated from the harness, a parachute rigger as the operator is frequently called who performs such work, may more easily and quickly, than has heretofore been the case, open my new link to disconnect the canopy with its shroud lines from the harness with its straps. Moreover, provision is made in the new link for positive action to separate parts of the new link should such become necessary or desirable, and also, for a visual determination of the location of such parts when they are in position for such separation. Thereby a single person handling parachutes can take care of a greater number in a given time. Similarly, a parachute canopy can more safely and readily be reconnected to the straps of a parachute harness by the new devices of this invention than has heretofore been the case. In making such a reconnection, the rigger cannot make a mistake in putting the parts of a new link together. Hence, the correct fastening together of the parts of a new link in closing it is insured. Further, the forces to which a new link may be subjected will be exerted against suitable strength members and the parts of the new links when closed cannot accidentally open or separate. In use, therefore, a canopy and harness using my new links will be securely connected together and provide a safe parachute for the person or cargo by whom or with which it is to be employed. At the same time, the ease of manufacture and relatively low manufacturing cost of the new devices made in accordance with my invention constitute a further advantage inuring thereto. Moreover, the opening and closing of the new links in respectively disassembling and assembling the parts thereof, is also simple. In effect, there are but two parts to the new devices so that there are no minute components to become misplaced and lost when the new links are disassembled.

Other and further objects and advantages of this invention will be apparent from the following description and from the drawings, which are illustrative only, in which Figure 1 is a view in side elevation of a preferred embodiment of the new link of this invention in its closed or assembled position connecting shroud lines and a load supporting strap of a parachute;

Figure 5 is a partial view of the foregoing embodiment with a retainer partly in cross section and in a position representing either initial closure engagement or a position just before final opening separation;

Figure 6 is a view of the foregoing new link embodiment, with the retainer thereof partly in cross section, in fully assembled, that is, in closed and locked position;

Figure 7 is a view of the foregoing embodiment with the retainer and body in respective relative positions productive of a positive ejection of the keys from the pocket recesses in the body of the new link;

Figure 8 is a view in cross section of the retainer block of Figure 6 taken along line VIII—VIII of Figure 6;

Figure 9 is a view, partly in cross section, of the link body illustrated showing a mode of recessing it;

Figure 10 is a view in side elevation, partly in cross section, illustrating a modified form of a new link of this invention; and Figure 11 is a view in end elevation of the modified embodiment of Figure 10 taken in the direction of the arrows XI—XI.

Figure 1:
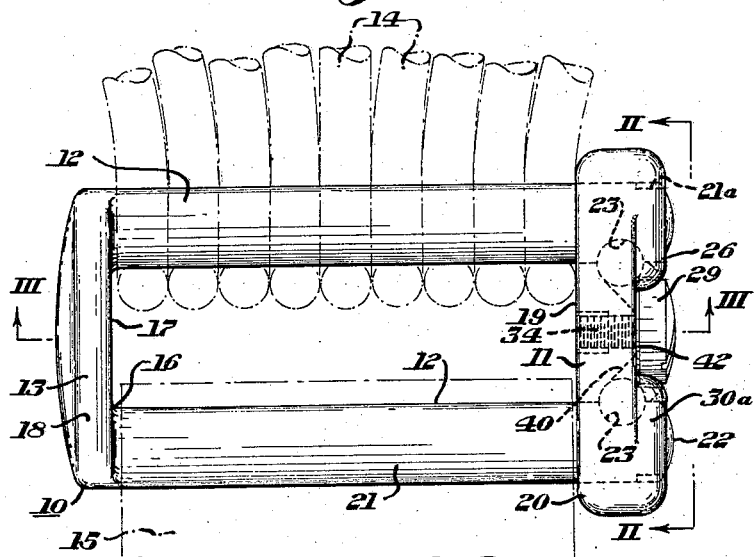
Figure 2:
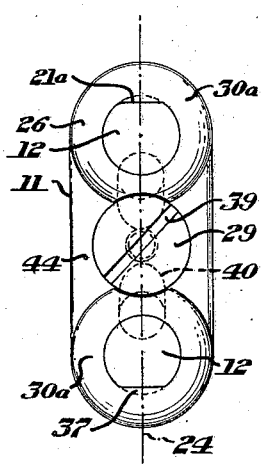
Figure 2 is an end view of the new link of Figure 1 looking in the direction of the arrows II—II.
Figure 3:
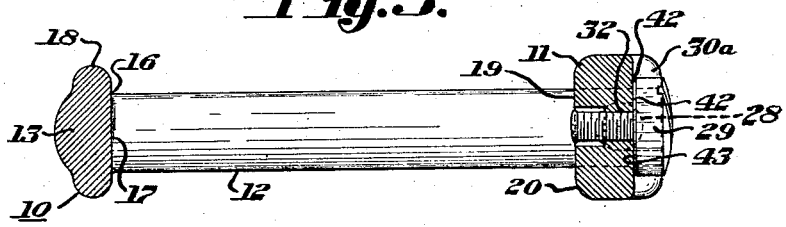
Figure 3 is a view, partly in cross section, of the new link of Figure 1, taken along line III—III thereof.
Figure 4:
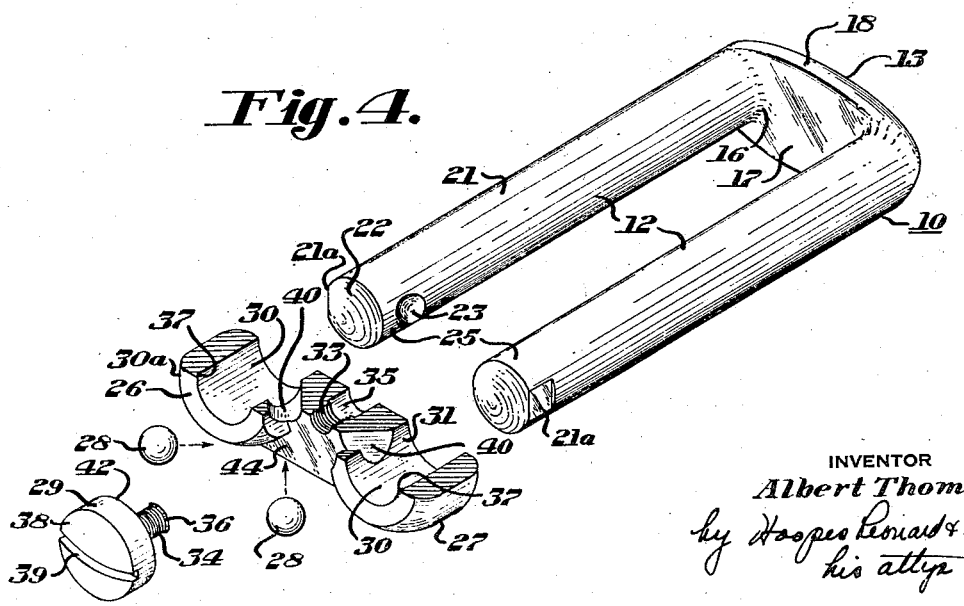
Figure 4 is an exploded view of the parts of the new link shown in Figure 1, with one of the principal parts partly in cross section.

In an embodiment as illustrated in Figures 1 to 9, a new link may comprise two separable parts in the form of a body 10 and a retainer 11. Body 10 is preferably U-shaped and as illustrated comprises a pair of spaced parallel legs 12 joined by a yoke 13 integral therewith. In use, the new link may be employed as shown in the position shown in Figure 1, the upper leg 12 being threaded through the loops at the lower ends of shroud lines 14. Similarly, the lower leg 12 may be threaded through a loop at the upper end of a load supporting strap 15 to connect those respective elements of a parachute. With retainer 11 secured in place as shown in Figures 1 and 2 to close the link, neither the shroud lines 14 nor the strap 15 can slide off the legs 12, since retainer 11 forms with body 10 a complete ring enclosure for the respective loops. Legs 12 may have filleted corners 16 where the legs merge into yoke 13. An inner face 17 of yoke 13 may be flat and the outer edges 18 thereof rounded to prevent chafing of the shroud lines and strap or straps adjacent thereto. Similarly, inside face 19 of retainer 11 may be flat and the edges 20 thereof may be rounded for a like purpose to prevent any tendency to chafe.

Each of the legs 12 is cylindrical, as shown, with an outer peripheral cylindrical surface 21 and a rounded end 22. A semi-spherical recess in the form of a pocket or blind recess 23 is provided on the inside of each of the legs 12 adjacent the ends 22 in generally opposed relation and in general alignment with a plane 24 passing through the axes of the legs 12. That portion of surfaces 21 adjoining the pockets 23 which is covered by the retainer 11 when the new link is closed constitutes external or male mating surfaces 25. Axially extending flat surfaces 21a recessed radially inwardly of the surfaces 25 may be provided from ends 22 in the direction of yoke 13 a distance permitting positive ejection as shown in Figure 7 while preventing retainer 11 to be assembled backwards on and relative to body 10.

Retainer 11 as illustrated comprises a block 27, a pair of keys 28 in the form of round steel balls, and an assembling member 29 in the form of a headed machine screw. Block 27 is provided with openings 30 drilled through bosses 30a in alignment with the axes respectively of legs 12 on the body 10 of the link with which retainer 11 is to be assembled. Thus, the surfaces 31 around the openings 30 are internal or female mating surfaces which in closure position fit closely around the external male surfaces 25 of legs 12. A central hole 32 is drilled longitudinally through block 27 between bosses 30a and tapped forming the female threads 33 to engage male threads 34 on the stem of screw 29. The inner end of opening 32 is enlarged into the form of a counterbore 35 the diameter of which will accommodate the innermost upset or mushroomed end 36 of screws 29. The outside of head 38 may be grooved by means of a groove 39 or otherwise recessed for a screw driver to rotate screw 29 relative to the block 27 in assembling and disassembling retainer 11 relative to body 10. The upsetting of the inner end 36 of screw 29 may readily be performed after the keys 28 and screw 29 have been assembled with block 27, as will be readily understood. Thereby, the respectively movable parts of retainer 11 are retained together and cannot be misplaced or lost even when retainer 11 is separated from body 10.

Oblique recesses 40 are drilled in block 27 between the female mating surfaces 31 and the surfaces of block 27 at the other end of the recesses 40. These recesses constitute passages 40 for the keys 28 which are movable therein in the course of assembling or disassembling a retainer 11 and a body 10. The axes of the straight passages 40 preferably lie in plane 24 and those axes may be at an angle such as 45° to the axes of the legs 12 and the coinciding axes of the openings 30. Because the walls of the passages 40 intersect at their inner ends the curved mating surfaces 31, there is, as shown in Figures 5 and 8, an edge or keeper surface 41 forming part of the lower edge of the passages 40 which keeps the respective balls 28 from falling out into openings 30 when a retainer 11 is separated from its body 10, even though the center of each ball 28 as shown in Figures 6 and 8 may move into a plane substantially tangent to surface 25 and hence to surface 31 at that point. The keys or balls 28 after the subassembly of retainer 11 has been made cannot fall out of the outer ends of the respective passages 40 because of head 38 of screw 29. Even if such an enlarged end 36 were not provided on screw 29, the screw 29 in disassembling a retainer and a body of a new link, such as the one shown in Figure 1, would be backed out of block 27 only a distance sufficient for disassembly and hence would there also prevent the keys in question from falling out past the outer face 44 of the particular retainer 11. Generally, the inner edge 42 of head 38 will be chamfered and the underside 43 of head 38 will seat itself tightly and hold against face 44 after the new link has been completely assembled. A lock washer may be used between surface 43 and seat 44, if desired.

The making of a new link such as the one shown in Figures 1 to 9 may readily be performed. For example, body 10 may be made of finished round rod or bar stock, which usually will be of steel. Such stock may be cut to length, bent into U-shape and yoke 13 and flats 21a formed in a stamping or forging operation using suitable dies. The radiused ends 22 of body 10 can be formed in the cutting of the stock, for example, or immediately thereafter on standard screw machines. Block 27 of retainer 11 may be forged or stamped by the use of suitable dies which may also round the corners thereof, or may otherwise be suitably made. A round pointed drill 45, for example, may be utilized to make the recesses 23 either before the stock for body is bent, or after the stock for body 10 is cut to length and shaped. The latter operation would usually involve the use of a jig and offset drilling as shown in Figure 9. There, the axis of drill 45 is shown in a plane normal to the axes of the legs 12 but offset from the plane 24 by an angle required by the thickness of the leg 12 not being drilled at the time being. The angle of such offset drilling should preferably be kept as low as feasible to keep pockets 23 substantially spherical segments.

Holes 30 and 32 and the counterboring operation to produce the counterbore 35 may readily be performed in a jig drilling operation. Similarly, a jig may be used for the drilling of the passages 40, a round pointed drill like drill 45 preferably being used. If desired, the pockets 23 may be made at the same time as the drilling of the passages 40 by the same drill 45 in which event the legs and block are engaged before such drilling. In such simultaneous drilling, absolute alignment would exist between passages 40 and pockets 23. However, having the pockets 23 drilled substantially normal to the axis of the legs 12 provides a somewhat more extensive bearing surface in the legs 12 for contact with the keys 28.

A ball punch may be used in the fabrication of block 27 to peen over and inwardly an outer portion 37 of the surfaces 31 to extend inwardly and slide along flat surfaces 21a and thereby make the assembling of a new link foolproof in that retainer 11, with members 37, can only be assembled with a body 10 when faces 26 and 44 are positioned outwardly as shown in Figures 5 and 6. Further, as described above, it is after the subassembly of retainer 11 has been made that end 36 of screw 29 may be enlarged by being upset or peened over to lock that end within the counterbore 35 and screw 29 in block 27.

In assembling a new link, legs 12 of body 10 are respectively threaded through the loops 14 and 15 as shown in Figure 1 before retainer 11 is applied to body 10. When retainer 11 is so applied, it is moved longitudinally relative to the axes of legs 12 over the outer ends 22 thereof as illustrated in Figure 5. At that stage, screw 29 is in a backed out position relative to block 27 so that the balls 28 may move inwardly toward the axis of the drilled and tapped opening 32. When screw 29 is in that unscrewed position with head 38 thereof separated from seat 44, there is room for the keys 28 to move inwardly in the converging passages 40 so that no part of the balls 28 are held in projecting relation to openings 30 by the head 38. On the other hand, the underside 43 and sides of head 38 remain spaced relative to block 27 and the outer ends of passages 40 a distance sufficient to keep the keys 28 from falling out of the outer ends of the passages 40 adjacent face 44. Further, the provision of the projections 37 prevents any assembling of a retainer 11 and a body 10 with head 38 of screw 29 facing yoke 13. The assembling operation is completed as shown in Figure 6 when screw 29 is screwed into block 27 so that the balls 28 move away from the axis of block 27 toward the axis of the holes 30 until the balls project beyond the inner ends of the passages 40 and the surfaces 31 and 41 into the openings 30, and, into the pockets 23 which pockets fit around the inwardly projecting respective portions of the keys 28. In the course of completing the keying and securing of the retainer 11 to body 10, there will be some relative longitudinal movement of the same until the keys 28 assume their final assembled position with the new link closed as shown in Figure 6.

The assembling operation just described is very simple and can be performed very rapidly. Moreover, if body 10 and retainer 11 are placed under forces in any direction tending to separate the two or otherwise, the new link will not come apart or fail and the resistance to such separating forces appears to be borne substantially entirely by the structural strength parts in the form of the body 10, the block 27 and the keys 28. In other words, under such forces, keys 28 transmit such forces between the bearing surfaces of pockets 23 in body 10 in contact with the keys 28 and the bearing surfaces of the passages 40 in block 27 also in contact with the keys 28. The screw 29 maintains the keys 28 in locking position without the presence of forces on screw 29 causing it to bind. Neither is there any tendency of screw 29 with the new link in its assembled or closed position, to loosen and lessen the interlock between a retainer 11 and a body 10. The various parts of the new link will be made to relatively close but easy fitting tolerance and the threads 34 of the stem of screw 29 will normally be in relatively tight fitting engagement with the threads 33 of the bore 32. The keys 28 are readily movable in passages 40 and into or out of pockets 23, as the case may be.

The disassembling or opening of a new link of the kind shown in Figures 1 to 9 is equally simple. To separate retainer 11 from body 10, screw 29 is screwed out of block 27 into a position as shown in Figure 7. Then the link should be turned so that the ends 22 of legs 12 are toward the ground, permitting the keys 28 to move by gravity toward face 44 in the passages 40, withdrawing them from their positions projecting into the pockets 23 so that the body 10 and retainer 11 of the link being opened may be separated. It will be noted that when screw 29 is backed out of block 27 as shown in Figure 7 the new link with the legs 12 vertical and the ends 22 thereof pointing downwardly may have the head 38 of screw 29 pressed against a firm surface which will move retainer 11 into a position as shown in Figure 7. In so doing balls 28, if gravity has not already moved them into the relative positions in passages 40 shown in Figure 5, will be forced into passage recesses 40 and out of any engagement with pocket recesses 23, with the balls being in the relative position shown in Figure 7, vertical downward pulling movement of retainer 11 relative to body 10 will separate the retainer and body. Further, because of the undercut relation of face 44 relative to faces 26, visual verification of the presence of the balls 28 wholly within the recesses 40 is obtainable. Thus, even if a key 28 should stick in locking position relative to blind recess 23 and body 10, its positive ejection may readily be brought about. Normally, the balls 28 will remain free enough to fall out by gravity when ends 22 are pointed vertically downwardly any time a new link is to be disassembled. After such separation, the various parts of retainer 11 remain together as a single part so that the smaller elements therefor in the form of screw 29 and balls 28 cannot be misplaced or lost.

In the modification shown in Figures 10 and 11, the respective parts of that modification corresponding generally in structure and functioning to parts of the preferred embodiment illustrated in the prior figures, have the same reference numerals with the addition of a prime factor thereto. In reviewing the modification, it will be noted that keys 28' are round cylindrical pins. Further, the passages 40' are drilled with a flat end drill which may be used to make pocket 23' at the same time that passages 40' are drilled thereby, in which event surface 100 would constitute the bottom of the hole drilled by such a drill into block 27' and legs 12'.

Moreover, a counterbore 37' in place of a face 44 may be provided in the nature of an outwardly flaring surface to engage the corresponding flaring surface 43' on the head of screw 29' which is in the form of a machine screw having a countersunk head. Surface 43' will also be, in the final assembly of the modified new link, adjoining the tops 101 of the round pins 28', preventing any dislodgment thereof in the use of the link shown in Figures 10 and 11. If desired, surfaces 101 may be ground so as to make surface rather than line contact with surface 43' when screw 29' is screwed tight into block 27'. In the modification, there is no enlarged end of screw 29' at the inner end of the stem 34' thereof corresponding to enlarged end 36 and screw 29' is entirely removed from block 27' when the pins 28' are withdrawn from pockets 23' to open the modified embodiment. Thus, retainer 11' when disassembled becomes more than one part of such modification.

In the assembling of the modification illustrated in Figures 10 and 11, the same steps are involved as in connection with the preferred embodiment except that the rigger who assembles the modification has to look at retainer block 27' to make certain that counterbore 37' is between the ends 22' and facing in the same direction and must separately handle the pins 28' and screw 29'. The keys 28' may be moved into pockets 23' by pointing ends 22' upwardly and letting the pins 28' slide down the oblique inwardly diverging passages 40'. The path of such keys is a straight line when the passages 40' are in direct alignment with pockets 23' because those respective holes are in absolute alignment, as distinguished from the slight deviation from absolue alignment between the passages 40 and the drilling axis of the pockets 23 in the illustrated preferred embodiment. Moreover, in closed link position, the entire bottom surface 102 of the keys 28', make contact with bottoms 100 which are wholly within the respective legs 12'.

In disassembling the modified new link of this invention, screw 29' is entirely backed out of block 27' and ends 22' pointed downwardly so that the pins 28' can fall or be shaken out through counterbore 37'. With the pin 28' out of pockets 23', the retainer 11' and body 10' can easily be separated.

This invention may be used other than in connection with parachutes and may be embodied in other forms without departing from the spirit or essential characteristics of this invention. The present embodiments are to be considered in all respects as illustrative rather than restrictive, the scope of the invention being indicated by the appended claims rather than by the description and all changes which come within the meaning and range of equivalents of the claims are intended to be embraced therein.

I claim:

1. A link comprising a U-shaped body having a pair of spaced apart legs respectively formed with lateral recesses facing each other, a retainer formed with a pair of openings to receive the respective legs therein and formed with a pair of obliquely disposed, relatively divergent passages which intersect the respective openings and which register with the respective recesses when said legs are inserted into such openings, a pair of keys movable in the respective passages toward and away from the respective legs to position an end of said keys in and out of such recesses respectively, a screw disposed generally parallel to such openings and therebetween and having threaded engagement with said retainer, said screw having a cam surface which engages and disengages said keys upon turning of said screw in opposite directions to respectively force said keys toward the respective legs into engagement in the respective recesses and to permit said keys to be moved away from the respective legs to a withdrawn position out of such recesses, said screw and retainer and said keys and passages being formed with complemental abutting surfaces which are effective to retain said screw, retainer, and keys together as a unitary assembly which can be assembled on and disassembled from said body as a unit.

2. The link of claim 1 wherein said legs extend through such openings in the properly assembled position of said retainer and said body, and wherein said legs and openings have complemental shoulder portions restricting insertion of said legs through such openings from one end only.

3. The link of claim 1 wherein the passages in which said keys are movable are so disposed that said keys move out of such recesses by gravity when said legs extend downwardly with said retainer disposed at the bottom of the link and when said screw is turned in the direction to permit the keys to be moved away from the respective legs.

References Cited in the file of this patent

UNITED STATES PATENTS

| | | |
|---|---|---|
| 578,211 | Clark | Mar. 2, 1897 |
| 644,638 | Rhodes | Mar. 6, 1900 |
| 746,086 | Hoyt | Dec. 8, 1903 |
| 890,958 | Boyd | June 16, 1908 |
| 1,502,528 | Reulbach | July 22, 1924 |
| 2,229,106 | Lomando | Jan. 21, 1941 |
| 2,289,818 | Winner | July 14, 1942 |
| 2,395,534 | Cook | Feb. 26, 1946 |
| 2,431,358 | Wilson | Nov. 25, 1947 |
| 2,447,921 | Thomas | Aug. 24, 1948 |
| 2,629,615 | Marsilius | Feb. 24, 1953 |

FOREIGN PATENTS

| | | |
|---|---|---|
| 224,694 | Great Britain | Nov. 20, 1924 |